(12) United States Patent
Haque

(10) Patent No.: US 7,279,059 B2
(45) Date of Patent: *Oct. 9, 2007

(54) POLYMER/WUCS MAT FOR USE IN AUTOMOTIVE APPLICATIONS

(75) Inventor: Enamul Haque, Novi, MI (US)

(73) Assignee: Owens Corning Intellectual Capital, LLCDE (US)

( * ) Notice: Subject to any disclaimer, the term of this patent is extended or adjusted under 35 U.S.C. 154(b) by 205 days.

This patent is subject to a terminal disclaimer.

(21) Appl. No.: 11/024,104

(22) Filed: Dec. 28, 2004

(65) Prior Publication Data

US 2006/0141884 A1 Jun. 29, 2006

(51) Int. Cl.
*B29C 70/52* (2006.01)

(52) U.S. Cl. ............... 156/166; 156/148; 156/62.2; 156/296; 156/283

(58) Field of Classification Search ........... 156/166, 156/38.2, 62.2, 283, 296, 180, 181, 256, 156/148, 308.2
See application file for complete search history.

(56) References Cited

U.S. PATENT DOCUMENTS

| | | | |
|---|---|---|---|
| 4,229,397 A | 10/1980 | Fukuta et al. | |
| 4,751,134 A | 6/1988 | Chenoweth et al. | |
| 4,840,755 A * | 6/1989 | Nakazawa et al. | ........... 264/15 |
| 4,889,764 A | 12/1989 | Chenoweth et al. | |
| 4,946,738 A | 8/1990 | Chenoweth et al. | |
| 5,565,049 A | 10/1996 | Simmons et al. | |
| 5,571,610 A | 11/1996 | Loftus et al. | |
| 5,632,949 A | 5/1997 | Fisher et al. | |
| 5,721,177 A | 2/1998 | Frank | |
| 5,736,475 A | 4/1998 | Bakhshi et al. | |
| 6,054,022 A | 4/2000 | Helwig et al. | |
| 6,148,641 A * | 11/2000 | Blough et al. | ........... 65/529 |
| 6,159,882 A | 12/2000 | Kean et al. | |
| 2002/0160682 A1 | 10/2002 | Zeng et al. | |
| 2003/0060113 A1 | 3/2003 | Christie et al. | |
| 2003/0121989 A1 | 7/2003 | Michael | |
| 2003/0134556 A1 | 7/2003 | Christie et al. | |
| 2003/0176131 A1 | 9/2003 | Tilton | |

(Continued)

FOREIGN PATENT DOCUMENTS

EP 0 297 500 1/1989

(Continued)

*Primary Examiner*—Jeff H. Aftergut
*Assistant Examiner*—Daniel McNally
(74) *Attorney, Agent, or Firm*—Inger H. Eckert; Margaret S. Milliken

(57) ABSTRACT

An acoustical and thermally absorbent chopped strand mat formed of thermoplastic bonding materials and bundles of reinforcing fibers is provided. The reinforcing fibers are preferably wet use chopped strand glass fibers (WUCS). The thermoplastic bonding materials may be any thermoplastic or thermosetting material having a melting point less than the reinforcing fiber. The chopped strand mat may be formed by partially opening the WUCS fibers and filamentizing the thermoplastic bonding materials, blending the reinforcement and thermoplastic bonding fibers, forming the reinforcement and thermoplastic bonding fibers into a sheet, and bonding the sheet. During bonding, the sheet is heated to a temperature above the melting point of the thermoplastic bonding fibers but below the temperature of the glass fibers. The melted thermoplastic bonding fibers act as a glue to hold the glass fibers in bundles. The chopped strand mat thus formed may be used as a reinforcement material in automotive applications.

9 Claims, 5 Drawing Sheets

U.S. PATENT DOCUMENTS

| | | |
|---|---|---|
| 2003/0194933 A1 | 10/2003 | Patel |
| 2004/0051212 A1 | 3/2004 | Michael |
| 2004/0161993 A1 | 8/2004 | Tripp et al. |
| 2005/0082721 A1 * | 4/2005 | Haque et al. ............... 264/324 |
| 2005/0115662 A1 | 6/2005 | Haque et al. |

FOREIGN PATENT DOCUMENTS

| | | |
|---|---|---|
| EP | 629651 A1 * | 12/1994 |
| WO | WO 01/31131 | 5/2001 |
| WO | WO 02/098643 | 12/2002 |
| WO | WO 03/057534 | 7/2003 |
| WO | WO 03/058600 | 7/2003 |
| WO | WO 2005/037897 | 4/2005 |
| WO | WO2005037897 A1 * | 4/2005 |
| WO | WO 2005/080659 | 9/2005 |

* cited by examiner

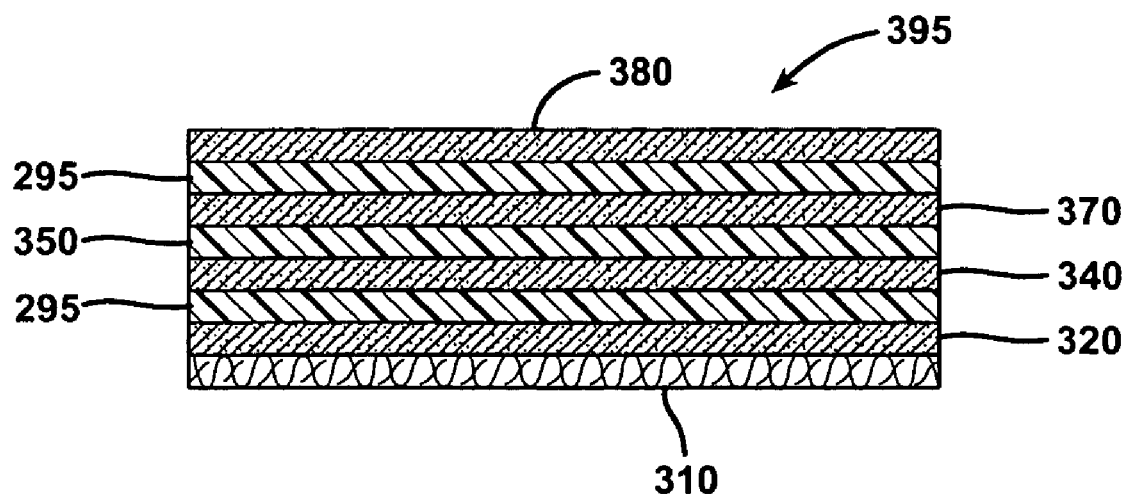
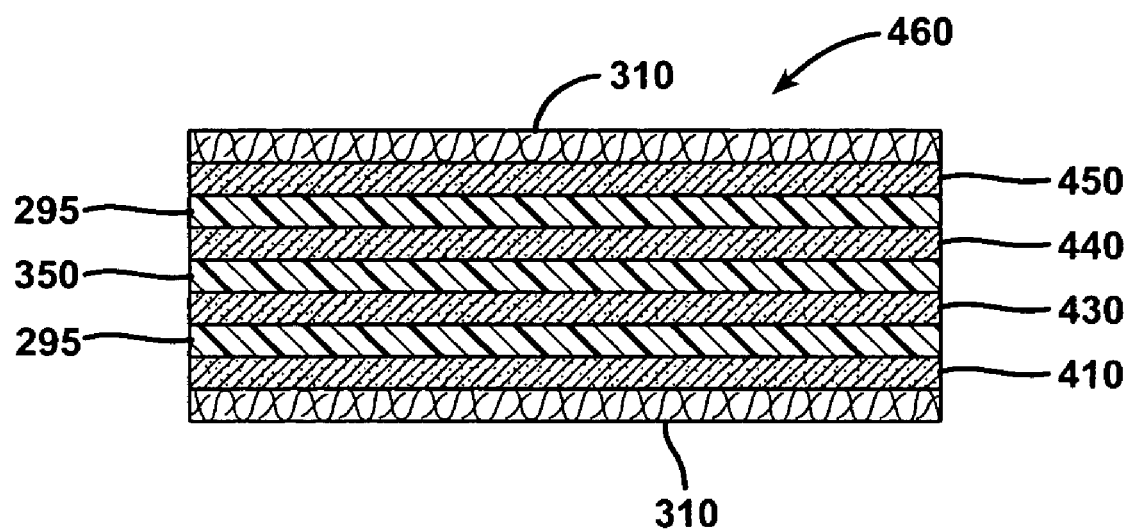

POLYMER/WUCS MAT FOR USE IN AUTOMOTIVE APPLICATIONS

TECHNICAL FIELD AND INDUSTRIAL APPLICABILITY OF THE INVENTION

The present invention relates generally to acoustical products, and more particularly, to an acoustical and thermally absorbent chopped strand mat that is formed of thermoplastic binding materials and bundles of reinforcing fibers and which can be used as a reinforcement material in automotive and industrial applications.

BACKGROUND OF THE INVENTION

Sound insulation materials are used in a variety of settings where it is desired to dampen noise from an external source. For example, sound insulation materials have been used in applications such as in appliances to reduce the sound emitted into the surrounding areas of a home, in automobiles to reduce mechanical sounds of the motor and road noise, and in office buildings to attenuate sound generated from the workplace, such as from telephone conversations or from the operation of office equipment. Conventional acoustical insulation materials include materials such as foams, compressed fibers, fiberglass batts, felts, and nonwoven webs of fibers such as meltblown fibers. Acoustical insulation typically relies upon both sound absorption (the ability to absorb incident sound waves) and transmission loss (the ability to reflect incident sound waves) to provide adequate sound attenuation.

In automobiles, the insulation material also relies upon thermal shielding properties to reduce or prevent the transmission of heat from various heat sources in the automobile (such as from the engine, transmission, exhaust, etc.) to the passenger compartment of the vehicle. Such insulation is commonly employed in the automobile as a headliner, dash liner, or firewall liner. Liners are typically formed of laminates of (1) one or more layers of an insulation material to provide desired mechanical strength properties and (2) one or more additional layers of a rigid material to permit simple and convenient installation in the automobile as well as proper functional performance.

Laminate materials may be conventionally formed by depositing a layer of loose chopped glass fibers onto an adhesive layer positioned on a scrim on a moving conveyor. A second adhesive layer is then placed onto the glass fibers to keep the glass fibers in place. If the laminate is to be used to form a headliner for an automobile, polyurethane boards are placed onto the second adhesive, and sequential layers of adhesive, chopped glass fibers, and adhesive are placed onto the polyurethane boards. The layered material is then passed through a lamination oven where heat and pressure is applied to form a composite material that can later be formed into a headliner.

One problem faced by manufacturers of these laminate composite materials is evenly distributing the chopped glass fibers onto the adhesive layer(s). If a uniform distribution of glass fibers is not provided, the final composite material may have undesirable properties. Another problem with conventional processes that use loose chopped glass is that adding the chopped glass during the manufacturing process is slow and costly. In addition, loose glass has the potential to be skin irritating if the fibers come into contact with the workers forming the laminated material.

One solution to the problems associated with the use of loose chopped glass has been to substitute a glass mat for the loose chopped glass. In one conventional process, glass roving is chopped on a conveyor system and a thin adhesive spunbond material is placed on top of the glass. A second layer of chopped glass is positioned on the spunbond material, forming a sandwich-like material of chopped glass/spunbond adhesive/chopped glass. The three-layered material is passed through a laminating oven to form a chopped glass mat. The mat may then be used in the production of a headliner as a substitute for the loose chopped glass used in other conventional processes. However, conventional mats using chopped roving are costly to manufacture. In addition, the mats do not have a porous structure to aid in the acoustical performance of the final product.

Therefore, there exists a need in the art for a non-woven mat for use as a reinforcement material in liners in automotive applications that exhibits superior sound attenuating properties, has improved structural, acoustical, and thermal properties, and that is lightweight and low in cost.

SUMMARY OF THE INVENTION

It is an object of the present invention to provide a method of forming a chopped strand mat that includes of bundles of reinforcing fibers and thermoplastic bonding materials. To form the chopped strand mat, bundles of wet reinforcing fibers are partially opened or "fluffed", but not filamentized, and at least partially dehydrated by removing water from the reinforcement fibers. The bundles of dried reinforcement fibers are mixed with a thermoplastic binding material, preferably in a high velocity air stream, to form a substantially homogenous mixture of bundles of reinforcement fibers and thermoplastic binding material. In at least one exemplary embodiment, the thermoplastic binding material is in a fibrous bundle form and is filamentized by an opening apparatus prior to mixing with the bundles of dehydrated reinforcement fibers. The mixture of the bundles of reinforcement fibers and thermoplastic bonding material is then formed into a sheet, such as by passing the mixture through a sheet former. The sheet may then be heated to a temperature above the melting point of the thermoplastic bonding material but below the melting point of the reinforcement fiber bundles to at least partially melt the thermoplastic material and bond the dehydrated reinforcement fiber bundles and thermoplastic bonding material. In addition, a bonding agent may be added to the sheet prior to bonding the reinforcement fiber bundles and thermoplastic bonding material. In some embodiments of the present invention where the thermoplastic material is a thermoplastic bonding fiber or a bicomponent fiber, the sheet may be subjected to a needling process to mechanically bond the dehydrated reinforcement fiber bundles and thermoplastic bonding fibers prior to bonding the reinforcement fiber bundles and thermoplastic bonding material or, alternatively, in place of bonding the fibers. The chopped strand mat thus formed may be used as a reinforcement in automotive applications, such as in a headliner for a motor vehicle.

It is another object of the present invention to provide a low weight acoustical and thermally insulative non woven chopped strand mat that is suitable for use in automotive applications. The chopped strand mat is formed of a substantially uniform distribution of bundles of dehydrated wet reinforcement fibers and at least one thermoplastic bonding material. The wet reinforcement fibers may be organic, inorganic, thermoplastic, or thermosetting fibers and may have lengths of from about 11 to about 75 mm and diameters of from about 8 to about 35 microns. The reinforcement fibers are preferably wet use chopped strand glass fibers. The thermoplastic bonding material may be any thermoplastic material as long as the melting point of the thermoplastic material is less than the melting point of the reinforcing fibers. The thermoplastic bonding material and bundles of reinforcing fibers are bonded by partially melted thermoplastic bonding material. The thermoplastic bonding material may be in fibrous form, or alternatively, may be in the form of a flake, granule, or powder. The bundles of reinforcement fibers may be present in the chopped strand mat in an amount of from about 80 to about 98% by weight and the thermoplastic bonding material may be present in an amount of from about 2 to about 20% by weight of the total fibers. In addition, the chopped strand mat preferably has a weight distribution of from about 80 to about 500 g/m².

It is yet another object of the present invention to provide a method of forming a laminate composite that includes depositing consecutive layers of a scrim, a first adhesive layer, a first layer of a chopped glass mat, a second adhesive layer, polyurethane boards, a third adhesive layer, a second layer of a chopped strand mat according to the instant invention, and a final adhesive layer on a moving conveyor. The layered composite product may then be passed through a lamination oven where heat and pressure are applied to form a final laminated composite material. The laminated composite material may be further processed into composite products such as liners for automobiles. For example, the laminated composite material may be trimmed and molded into a headliner. In a further processing step, a headliner fabric material such as cloth, vinyl, leather, or wall paper may be applied to the headliner for aesthetic purposes.

It is a further objected of the present invention to provide a method of forming a laminate composite that may be formed into a headliner for an automobile. In a first assembly line, a first laminate product formed of sequential layers of a scrim, a first adhesive, a chopped strand mat according to the instant invention, and a second adhesive is made. In a second assembly line, a second laminate product formed of a polyurethane foam material, a third adhesive layer, a chopped strand mat layer, a fourth adhesive layer, and a scrim is produced. The first and second assembly lines may converge in-line such that the second adhesive layer is positioned against the polyurethane foam material. The layered composite thus formed is composed of consecutive layers of scrim, a first adhesive layer, a first chopped strand mat layer, a second adhesive layer, a polyurethane foam material layer, a third adhesive layer, a second chopped strand mat layer, a fourth adhesive layer, and a second scrim layer. The layered composite product may be passed through a lamination oven where heat and pressure are applied to form a final laminated composite material. The laminated composite material may be further processed by conventional methods into composite products such as a liner for an automobile. For example, the laminated composite material may be trimmed and formed into a headliner, such as by a molding process. Foam or fabric may then be applied to the headliner for aesthetic purposes.

It is an advantage of the present invention that the chopped strand mat provides the ability to optimize and/or tailor the physical properties of the mat by altering the weight, length, and/or diameter of the reinforcement and/or thermoplastic bonding fibers used in the chopped mat. As a result, a large variety of chopped strand mats and composite products formed from the chopped strand mats can be manufactured.

It is a further advantage of the present invention that the chopped strand mat has a uniform or substantially uniform distribution of reinforcement fiber bundles and thermoplastic bonding fibers which provides improved strength, acoustical and thermal properties, stiffness, impact resistance, and acoustical absorbance.

It is also an advantage of the present invention that the inventive chopped strand mats have a more uniform weight consistency and uniform properties compared to conventional chopped strand glass mats.

It is another advantage of the present invention that when wet use chopped strand glass fibers are used as the reinforcing fiber, the glass fibers may be easily opened and fiberized with little generation of static electricity due to the moisture present in the glass fibers. In addition, wet use chopped strand glass fibers are less expensive to manufacture than dry chopped fibers because dry fibers are typically dried and packaged in separate steps before being chopped. Therefore, the use of wet use chopped strand glass fibers allows liners to be manufactured at lower costs.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a schematic illustration of the glass/polyurethane layered composite product formed by the exemplary process depicted in FIG. 3;

FIG. 6 is a schematic illustration of the glass/polyurethane layered composite product formed by the exemplary process depicted in FIG. 5.

DETAILED DESCRIPTION AND PREFERRED EMBODIMENTS OF THE INVENTION

Figure 1:
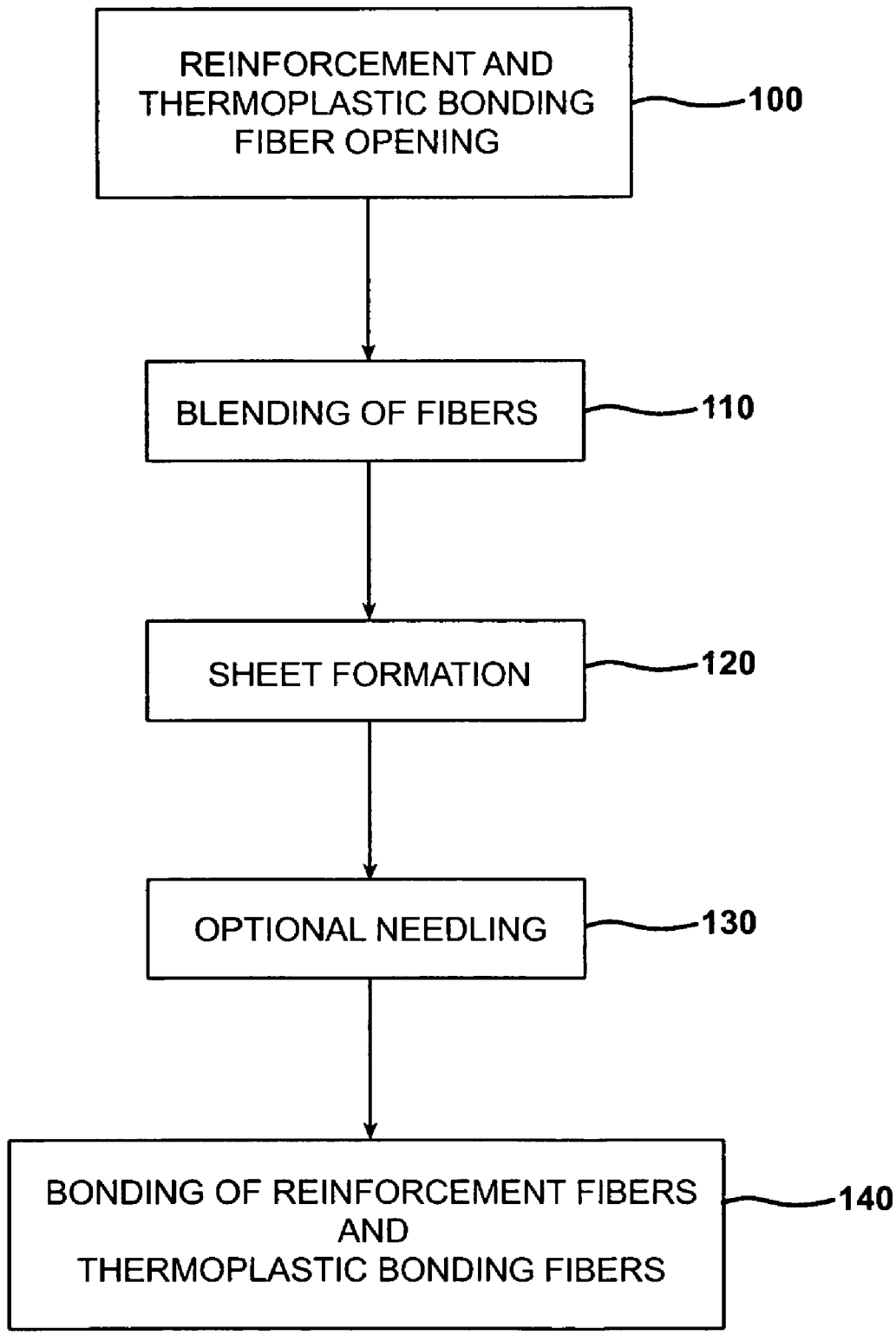
FIG. 1 is a flow diagram illustrating steps for using wet reinforcement fibers in a dry-laid process according to one aspect of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references.

In the drawings, the thickness of the lines, layers, and regions may be exaggerated for clarity. It is to be noted that like numbers found throughout the figures denote like elements. The terms "top", "bottom", "side", and the like are used herein for the purpose of explanation only. It will be understood that when an element such as a layer, region, substrate, or panel is referred to as being "on" another element, it can be directly on the other element or intervening elements may also be present. If an element or layer is described as being "adjacent to" or "against" another element or layer, it is to be appreciated that that element or layer may be directly adjacent to or directly against that other element or layer, or intervening elements may be present. It will also be understood that when an element such as a layer, region, or substrate is referred to as being over another element, it can be directly over the other element, or intervening elements may be present.

The terms "sheet" and "mat" may be used interchangeably herein. In addition, the terms "thermoplastic bonding fibers" and "thermoplastic binding fibers" may be used interchangeably, as well as the terms "reinforcing fibers" and "reinforcement fibers".

The invention relates to a chopped strand mat formed of reinforcing fibers and thermoplastic binding materials. The reinforcement fibers may be any type of fibers suitable for providing good structural qualities as well as good acoustical and thermal properties. The reinforcing fibers may be any type of organic, inorganic, thermoplastic, or thermosetting fiber as long as the melting point of the reinforcing fiber is greater than the melting point of the thermoplastic binding fibers. Suitable examples of reinforcing fibers include glass fibers, wool glass fibers, natural fibers, metal fibers, ceramic fibers, mineral fibers, carbon fibers, graphite fibers, nylon fibers, rayon fibers, and polymer based thermoplastic materials such as, but not limited to, polyester fibers, polyethylene fibers, polypropylene fibers, polyethylene terephthalate (PET) fibers, polyphenylene sulfide (PPS) fibers, polyvinyl chloride (PVC) fibers, and ethylene vinyl acetate/vinyl chloride (EVA/VC) fibers, and mixtures thereof. The chopped strand mat may be entirely formed of one type of reinforcement fiber (such as a natural fiber or glass fibers) or, alternatively, more than one type of reinforcement fiber may be used in forming the chopped strand mat. The term "natural fiber" as used in conjunction with the present invention refers to plant fibers extracted from any part of a plant, including, but not limited to, the stem, seeds, leaves, roots, or bast. Preferably, the reinforcing fiber material is glass fibers.

The reinforcing fibers may be chopped fibers having a discrete length of from about 11 to about 75 mm in length, and preferably, a length of from about 12 to about 30 mm. Additionally, the reinforcing fibers may have diameters of from about 8 to about 35 microns, and preferably have diameters of from about 12 to about 23 microns. Further, the reinforcing fibers may have varying lengths (aspect ratios) and diameters from each other within chopped strand mat. The reinforcing fibers may be present in the chopped strand mat in an amount of from about 80 to about 98% by weight of the total fibers, and are preferably present in the chopped strand mat in an amount of from about 85 to about 95% by weight.

The thermoplastic binding material may be any thermoplastic or thermosetting material having a melting point less than the reinforcing fiber. Non-limiting examples of thermoplastic and thermosetting binding materials suitable for use in the chopped strand mat include polyester fibers, polyethylene fibers, polypropylene fibers, polyethylene terephthalate (PET) fibers, polyphenylene sulfide (PPS) fibers, polyvinyl chloride (PVC) fibers, ethylene vinyl acetate/vinyl chloride (EVA/VC) fibers, lower alkyl acrylate polymer fibers, acrylonitrile polymer fibers, partially hydrolyzed polyvinyl acetate fibers, polyvinyl alcohol fibers, polyvinyl pyrrolidone fibers, styrene acrylate fibers, polyolefins, polyamides, polysulfides, polycarbonates, rayon, nylon, phenolic resins, epoxy resins, and butadiene copolymers such as styrene/butadiene rubber (SBR) and butadiene/acrylonitrile rubber (NBR). One or more types of thermoplastic or thermosetting materials may be used to form the chopped strand mat. In addition, if the thermoplastic bonding material is a thermoplastic bonding fiber, the fiber may be functionalized with acidic groups, for example, by carboxylating with an acid such as a maleated acid or an acrylic acid, or the thermoplastic bonding fibers may be functionalized by adding an anhydride group or vinyl acetate. The thermoplastic binding material may also be in the form of a flake, granule, or a powder rather than in the form of a thermoplastic polymeric fiber.

The thermoplastic binding material may also be in the form of multicomponent fibers such as bicomponent polymer fibers, tricomponent polymer fibers, or plastic-coated mineral fibers such as thermoplastic coated glass fibers. The bicomponent fibers may be arranged in a sheath-core, side-by-side, islands-in-the-sea, or segmented-pie arrangement. Preferably, the bicomponent fibers are formed in a sheath-core arrangement in which the sheath is formed of first polymer fibers that substantially surrounds a core formed of second polymer fibers. It is not required that the sheath fibers totally surround the core fibers. The first polymer fibers have a melting point lower than the melting point of the second polymer fibers so that upon heating the bicomponent fibers to a temperature above the melting point of the first polymer fibers (sheath fibers) and below the melting point of the second polymer fibers (core fibers), the first polymer fibers will soften or melt while the second polymer fibers remain intact. This softening of the first polymer fibers (sheath fibers) will cause the first polymer fibers to become sticky and bond the first polymer fibers to themselves and other fibers that may be in close proximity.

Numerous combinations of materials can be used to make the bicomponent polymer fibers, such as, but not limited to, combinations using polyester, polypropylene, polysulfide, polyolefin, and polyethylene fibers. Specific polymer combinations for the bicomponent fibers include polyethylene terephthalate/polypropylene, polyethylene terephthalate/polyethylene, and polypropylene/polyethylene. Other non-limiting bicomponent fiber examples include copolyester polyethylene terephthalate/polyethylene terephthalate (co-PET/PET), poly 1,4 cyclohexanedimethyl terephthalate/polypropylene (PCT/PP), high density polyethylene/polyethylene terephthalate (HDPE/PET), high density polyethylene/polypropylene (HDPE/PP), linear low density polyethylene/polyethylene terephthalate (LLDPE/PET), nylon 6/nylon 6,6 (PA6/PA6,6), and glycol modified polyethylene terephthalate/polyethylene terephthalate (6PETg/PET).

The bicomponent polymer fibers may have a percent by weight of from about 1 to about 18 dernier and a length of from about 2 to about 4 mm. It is preferred that the first polymer fibers (sheath fibers) have a melting point within the range of from about 150 to about 400° F., and more preferably in the range of from about 170 to about 300° F. The second polymer fibers (core fibers) have a higher melting point, preferably above about 350° F.

The thermoplastic binding material may be present in the chopped strand mat in an amount of from about 2 to about 20% by weight of the total fibers and preferably from about 2 to about 5% by weight.

The chopped strand mat may be formed by a dry-laid process, such as the dry-laid process described in U.S. patent application Ser. No. 10/688,013, filed on Oct. 17, 2003, to Enamul Haque entitled "Development Of Thermoplastic Composites Using Wet Use Chopped Strand Glass In A Dry Laid Process", which is incorporated by reference in its entirety. In preferred embodiments, the reinforcing fibers used to form the chopped strand mat are wet reinforcing fibers, and most preferably are wet use chopped strand glass fibers. Wet use chopped strand glass fibers for use as the reinforcement fibers may be formed by conventional processes known in the art. It is desirable that the wet use chopped strand glass fibers have a moisture content of from about 5 to about 30%, and more preferably have a moisture content of from about 5 to about 15%.

An exemplary process for forming the chopped strand mat is generally illustrated in FIG. 1, and includes partially opening the reinforcement fibers and thermoplastic bonding fibers (step 100), blending the reinforcement and thermoplastic bonding fibers (step 110), forming the reinforcement and thermoplastic bonding fibers into a sheet (step 120), optionally needling the sheet to give the sheet structural integrity (step 130), and bonding the reinforcement and thermoplastic bonding fibers (step 140).

The reinforcing fibers and the fibers forming the thermoplastic binding material are typically agglomerated in the form of a bundle of individual fibers. In forming the chopped strand mat, the bundles of reinforcing fibers and thermoplastic binding fibers are partially opened by an opening system, such as a bundle opening system, common in the industry. The opening system serves to decouple the clustered fibers and enhance fiber-to-fiber contact.

Figure 2:
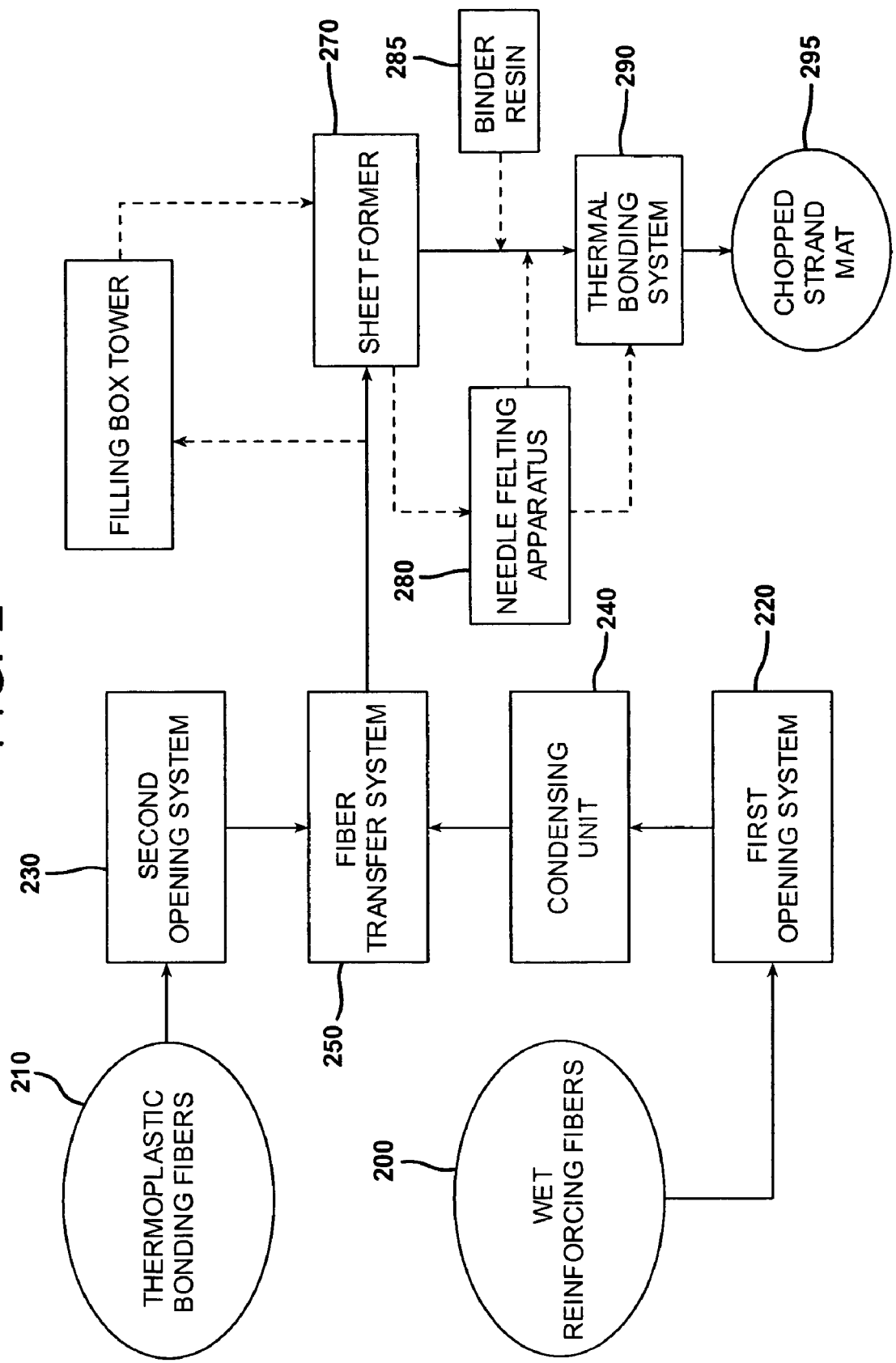
FIG. 2 is a schematic illustration of an air-laid process using wet reinforcement fibers to form a chopped strand mat according to at least one exemplary embodiment of the present invention.

Turning now to FIG. 2, the opening of the wet reinforcement fibers and the thermoplastic bonding fibers can best be seen. The wet reinforcing fibers 200 are fed into a first opening system 220 and the thermoplastic bonding fibers 210 are fed into a second opening system 230 to at least partially open the wet reinforcing fiber bundles and thermoplastic bonding fiber bundles respectively. It is desirable that the first opening system 220 partially open, but not filamentize, the bundles of wet reinforcement fibers 200. It is to be noted that although the exemplary process depicted in FIGS. 1 and 2 show opening the thermoplastic bonding fibers 210 by a second opening system 230, the thermoplastic bonding fibers 210 may be fed directly into the fiber transfer system 250 if the thermoplastic bonding fibers 210 are present or obtained in a filamentized form (not shown), and not present or obtained in the form of a bundle. Such an embodiment is considered to be within the purview of this invention.

The first and second opening systems 220, 230 are preferably bundle openers, but may be any type of opener suitable for opening the bundles of thermoplastic binding fibers 210 and bundles of wet reinforcing fibers 200. The design of the openers depends on the type and physical characteristics of the fiber being opened. Suitable openers for use in the present invention include any conventional standard type bundle openers with or without a weighing device. The weighing device serves to continuously weigh the partially opened fibers as they are passed through the bundle opener to monitor the amount of fibers that are passed onto the next processing step. The bundle openers may be equipped with various fine openers, one or more licker-in drums or saw-tooth drums, feeding rollers, and/or or a combination of a feeding roller and a nose bar.

In alternate embodiments where the thermoplastic binding material is in the form of a flake, granule, or powder (not shown in FIG. 2), and not a thermoplastic bonding fiber, the second opening system 230 may be replaced with an apparatus suitable for distributing the powdered or flaked thermoplastic bonding material to the fiber transfer system 250 for mixing with the reinforcement fibers 200. A suitable apparatus would be easily identified by those of skill in the art. In embodiments where a resin in the form of a flake, granule, or powder is used in addition to the thermoplastic binding fibers 210 (not shown in FIG. 2), the apparatus for distributing the flakes, granules, or powder typically does not replace the second opening system 230. The thermoplastic flakes, granules, or powder may be fed directly into the fiber transfer system 250 for mixing with the reinforcement fiber bundles and thermoplastic bonding material.

The partially opened wet reinforcement fibers 200 may then be dosed or fed from the first opening system 220 to a condensing unit 240 to remove water from the wet fibers. In exemplary embodiments, greater than about 70% of the free water (water that is external to the reinforcement fibers) is removed. Preferably, however, substantially all of the water is removed by the condensing unit 240. It should be noted that the phrase "substantially all of the water" as it is used herein is meant to denote that all or nearly all of the free water is removed. The condensing unit 240 may be any known drying or water removal device known in the art, such as, but not limited to, an air dryer, an oven, rollers, a suction pump, a heated drum dryer, an infrared heating source, a hot air blower, or a microwave emitting source.

The bundles of reinforcing fibers 200 and the thermoplastic binding fibers 210 are blended together by the fiber transfer system 250. In preferred embodiments, the fibers are blended in a high velocity air stream. The fiber transfer system 250 serves both as a conduit to transport the thermoplastic binding fibers 210 and bundles of reinforcing fibers 200 to the sheet former 270 and to substantially uniformly mix the fibers in the air stream. It is desirable to distribute the reinforcing fibers 200 and thermoplastic bonding fibers 210 as uniformly as possible. The ratio of reinforcing fibers 200 and thermoplastic binding fibers 210 entering the air stream in the fiber transfer system 250 may be controlled by the weighing device described above with respect to the first and second opening systems 220, 230 or by the amount and/or speed at which the fibers are passed through the first and second opening systems 220, 230. In preferred embodiments, the ratio of reinforcing fibers 200 to thermoplastic binding fibers 210 present in the air stream is 90:10, reinforcement fibers 200 to thermoplastic bonding fibers 210 respectively.

The mixture of reinforcing fibers 200 and thermoplastic bonding fibers 210 may be transferred by the air stream in the fiber transfer system 250 to a sheet former 270 where the fibers are formed into a sheet. One or more sheet formers may be utilized in forming the chopped strand mat. In some embodiments of the present invention, the blended fibers are transported by the fiber transfer system 250 to a filling box tower 260 where the bundles of reinforcing fibers 200 and thermoplastic bonding fibers 210 are volumetrically fed into the sheet former 270, such as by a computer monitored electronic weighing apparatus, prior to entering the sheet former 270. The filling box tower 260 may be located internally in the sheet former 270 or it may be positioned external to the sheet former 270. The filling box tower 260 may also include baffles to further blend and mix the reinforcement fibers 200 and thermoplastic bonding fibers 210 prior to entering the sheet former 270. In some embodiments, a sheet former 270 having a condenser and a distribution conveyor may be used to achieve a higher fiber feed into the filling box tower 260 and an increased volume of air through the filling box tower 260. In order to achieve an improved cross-distribution of the opened fibers, the distributor conveyor may run transversally to the direction of the sheet. As a result, the thermoplastic bonding fibers 210 and the bundles of reinforcing fibers 200 may be transferred into the filling box tower 260 with little or no pressure and minimal fiber breakage.

The sheet formed by the sheet former 270 contains a substantially uniform distribution of bundles of reinforcing fibers 200 and thermoplastic bonding fibers 210 at a desired ratio and weight distribution. The sheet formed by the sheet former 270 may have a weight distribution of from about 80 to about 500 g/m$^2$, with a preferred weight distribution of from about 80 to about 300 g/m$^2$.

In one or more embodiments of the invention, the sheet exiting the sheet former 270 is optionally subjected to a needling process in a needle felting apparatus 280 in which barbed or forked needles are pushed in a downward and/or upward motion through the fibers of the sheet to entangle or intertwine the reinforcing fibers 200 and thermoplastic bonding fibers 210 and impart mechanical strength and integrity to the mat. The needle felting apparatus 280 may include a web feeding mechanism, a needle beam with a needleboard, barbed felting needles ranging in number from about 500 per meter to about 7,500 per meter of machine width, a stripper plate, a bed plate, and a take-up mechanism. Mechanical interlocking of the reinforcement fibers 200 and thermoplastic bonding fibers 210 is achieved by passing the barbed felting needles repeatedly into and out of the sheet. An optimal needle selection for use with the particular reinforcement fiber and polymer fiber chosen for use in the inventive process would be easily identified by one of skill in the art.

Although the thermoplastic binder material 210 is used to bond the reinforcing fibers 200 to each other, a binder resin 285 may be added as an additional bonding agent prior to passing the sheet through the thermal bonding system 290. The binder resin 285 may be in the form of a resin powder, flake, granule, foam, or liquid spray. The binder resin 285 may be added by any suitable manner, such as, for example, a flood and extract method or by spraying the binder resin 285 on the sheet. The amount of binder resin 285 added to the sheet may be varied depending of the desired characteristics of the chopped strand mat. A catalyst such as ammonium chloride, p-toluene, sulfonic acid, aluminum sulfate, ammonium phosphate, or zinc nitrate may be used to improve the rate of curing and the quality of the cured binder resin 285.

Another process that may be employed to further bond the reinforcing fibers 200 either alone, or in addition to, the other bonding methods described herein, is latex bonding. In latex bonding, polymers formed from monomers such as ethylene ($T_g$ −125° C.), butadiene ($T_g$ −78° C.), butyl acrylate ($T_g$ −52° C.), ethyl acrylate ($T_g$ −22° C.), vinyl acetate ($T_g$ 30° C.), vinyl chloride ($T_g$ 80° C.), methyl methacrylate ($T_g$ 105° C.), styrene ($T_g$ 105° C.), and acrylonitrile ($T_g$ 130° C.) are used as bonding agents. A lower glass transition temperature ($T_g$) results in a softer polymer. Latex polymers may be added as a spray prior to the sheet entering the thermal bonding system 290. Once the sheet enters the thermal bonding system 290, the latex polymers melt and bond the reinforcement fibers 200 together.

A further optional bonding process that may be used alone, or in combination with the other bonding processes described herein is chemical bonding. Liquid based bonding agents, powdered adhesives, foams, and, in some instances, organic solvents can be used as the chemical bonding agent. Suitable examples of chemical bonding agents include, but are not limited to, acrylate polymers and copolymers, styrene-butadiene copolymers, vinyl acetate ethylene copolymers, and combinations thereof. For example, polyvinyl acetate (PVA), ethylene vinyl acetate/vinyl chloride (EVA/VC), lower alkyl acrylate polymer, styrene-butadiene rubber, acrylonitrile polymer, polyurethane, epoxy resins, polyvinyl chloride, polyvinylidene chloride, and copolymers of vinylidene chloride with other monomers, partially hydrolyzed polyvinyl acetate, polyvinyl alcohol, polyvinyl pyrrolidone, polyester resins, and styrene acrylate may be used as a chemical bonding agent. The chemical bonding agent may be applied uniformly by impregnating, coating, or spraying the sheet.

Either after the sheet exits the sheet former 270 or after the optional needling of the sheet, the sheet may be passed through a thermal bonding system 290 to bond the reinforcement fibers 200 and thermoplastic bonding fibers 210 and form the chopped strand mat 295. However, it is to be appreciated that if the sheet is needled in the needle felting apparatus 280 and the reinforcing fibers 200 and the thermoplastic bonding fibers 210 are mechanically bonded, the sheet may not need to be, passed through the thermal bonding system 290 to form the chopped strand mat 295.

In the thermal bonding system 290, the sheet is heated to a temperature that is above the melting point of the thermoplastic bonding fibers 210 but below the melting point of the reinforcement fibers 200. When bicomponent fibers are used as the thermoplastic bonding fibers 210, the temperature in the thermal bonding system 290 is raised to a temperature that is above the melting temperature of the sheath fibers, but below the melting temperature of the reinforcement fibers 200. Heating the thermoplastic bonding fibers 210 to a temperature above their melting point, or the melting point of the sheath fibers in the instance where the thermoplastic bonding fibers 210 are bicomponent fibers, causes the thermoplastic bonding fibers 210 to become adhesive and bond the thermoplastic bonding fibers 210 both to themselves and to adjacent the reinforcing fibers 200. The melted thermoplastic bonding fibers 210 act as a glue to hold the dispersed glass fibers in bundles. If the thermoplastic bonding fibers 210 completely melt, the melted fibers may encapsulate the reinforcement fibers 200. As long as the temperature within the thermal bonding system 290 is not raised as high as the melting point of the reinforcing fibers and/or core fibers, these fibers will remain in a fibrous form within the thermal bonding system 290 and chopped strand mat 295.

The thermal bonding system 290 may include any known heating and/or bonding method known in the art, such as oven bonding, oven bonding using forced air, infrared heating, hot calendaring, belt calendaring, ultrasonic bonding, microwave heating, and heated drums. Optionally, two or more of these bonding methods may be used in combination to bond the reinforcing fibers 200 and thermoplastic bonding fibers 210. The temperature of the thermal bonding system 290 varies depending on the melting point of the particular thermoplastic bonding fibers 210, binder resins, and/or latex polymers used, and whether or not bicomponent fibers are present in the sheet. The chopped strand mat 295 that emerges from the thermal bonding system 290 contains dispersed thermoplastic bonding fibers and reinforcement fibers in bundles. When wet use chopped strand glass is used as the wet reinforcing fibers 200, the chopped mat 295 that emerges from the thermal bonding system 290 contains dispersed thermoplastic bonding fibers 210 and glass filaments in bundles.

In an alternate embodiment (not illustrated), the chopped strand mat is formed by a wet-laid process. For example, reinforcing fibers and thermoplastic bonding fibers are dispersed in an aqueous solution that contains a binder as well as dispersants, viscosity modifiers, defoaming agents, and/or other chemical agents and agitated to form a slurry. The thermoplastic bonding fibers and reinforcing fibers located in the slurry are then deposited onto a moving screen where water is removed. Optionally, the mat is dried in an oven. The mat may then be immersed in a binder composition to impregnate the mat with the binder composition. The mat is then passed through a curing oven to remove any remaining water, cure the binder, and at least partially melt the thermoplastic bonding fibers to bind the reinforcing fibers and thermoplastic bonding fibers together. The resulting chopped strand mat is an assembly of dispersed thermoplastic fibers and glass filaments in bundles.

In a further alternate embodiment (not illustrated), the chopped strand mat is formed by a wet-laid process such as described above but does not use thermoplastic bonding fibers. In such an embodiment, the curing of the binders in the curing oven is sufficient to provide integrity to the reinforcing fibers and form a chopped strand mat.

The chopped strand mat 295 may be used in numerous applications, such as, for example, a reinforcement material in automotive applications such as in headliners, hood liners, floor liners, trim panels, parcel shelves, sunshades, instrument panel structures, door inners, and the like, in hand lay-ups for marine industries (boat building), vacuum and pressure bagging, cold press molding, matched metal die molding, and centrifugal casting. The chopped strand mat 295 may also be used in a number of non-structural acoustical applications such as in appliances, in office screens and partitions, in ceiling tiles, and in building panels.

Figure 3:
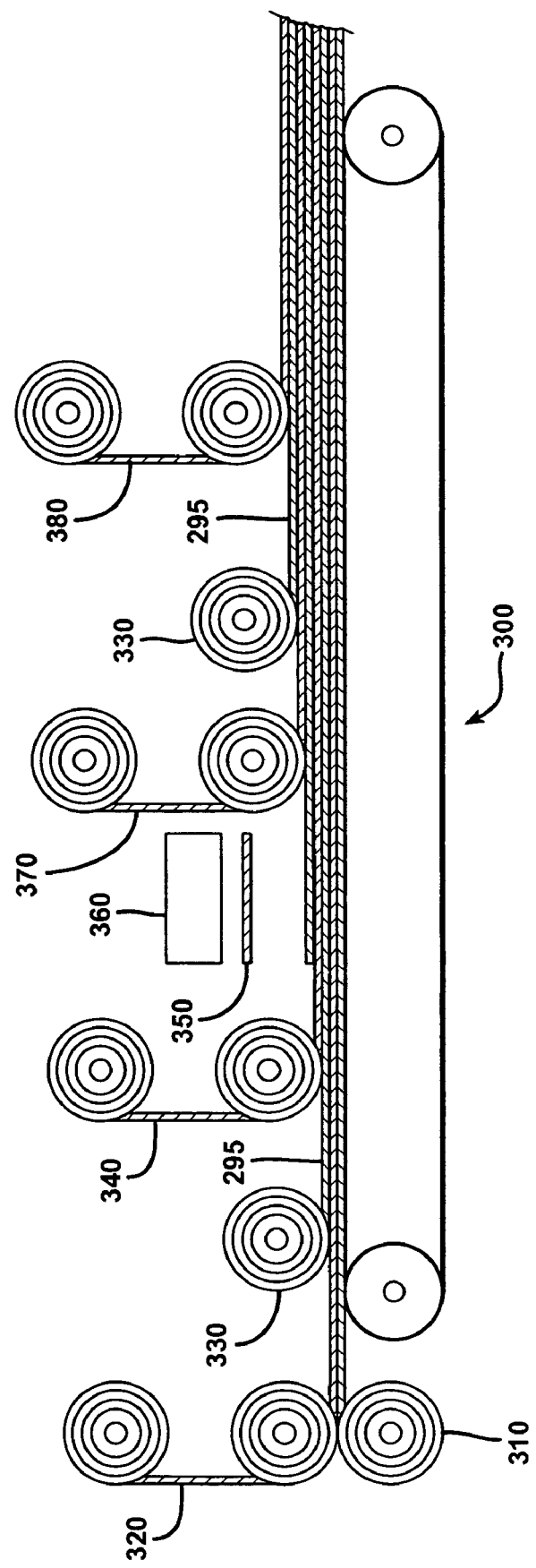
FIG. 3 is a schematic illustration of a dry polyurethane laminate process for making a glass/polyurethane layered composite product according to one aspect of the present invention.

In one exemplary embodiment of the invention, the chopped strand mat 295 is utilized in a dry polyurethane foam laminate process to form a liner, such as a headliner, for an automobile. One example of a dry polyurethane foam laminate process for producing liners for automobiles is illustrated in FIG. 3. A first adhesive layer 320 is fed onto a scrim 310 positioned on a moving conveyor belt 300. A chopped strand mat 295 fed from a roll 330 is laminated onto the first adhesive layer 320 and is covered by a second adhesive layer 340 such that the first layer of chopped strand mat 295 is sandwiched between the first and second adhesive layers 320, 340. A semi-rigid polyurethane foam material such as polyurethane foam boards 350 is then positioned on the second adhesive layer 340 by a polyurethane foam material dispensing apparatus 360, and a third adhesive layer 370 is placed on the polyurethane boards 350. It is to be appreciated that other structural boards or structural layers may be substituted for the polyurethane foam boards 350 and layered composite products 395 including such structural boards or layers are considered to be within the purview of this invention. A second chopped strand mat layer is then deposited onto the third adhesive layer 370. A final adhesive layer 380 is positioned on the second chopped strand mat layer, thereby placing the second chopped strand mat layer between the third adhesive layer 370 and final adhesive layer 380. Thus, the layered composite product 395, as depicted schematically in FIG. 4, may be formed of consecutive layers of scrim 310, a first adhesive layer 320, a layer formed of a chopped glass mat 295, a second adhesive layer 340, polyurethane boards 350, a third adhesive layer 370, a second layer formed of a chopped strand mat 295, and a final adhesive layer 380.

The layered composite product 395 may be passed through a lamination oven (not shown) where heat and pressure are applied to form a final laminated composite material (not shown). The laminated composite material may be further processed by conventional methods into composite products such as a liner for an automobile. For example, the laminated composite material may be trimmed and formed into a headliner, such as in a molding process. In a further processing step, a headliner fabric material such as cloth, vinyl, leather, foam, or wall paper may be positioned on the final adhesive layer 380 for aesthetic purposes.

The first, second, third, and final adhesive layers are formed of first, second, third, and fourth adhesives respectively. The adhesives are preferably in a film form, but may be in a powdered form. Suitable adhesive examples include, but are not limited to, polyethylene or derivatives thereof, copolymers of ethylene and vinyl acetate (EVA), copolymers of ethylene and acetic acid (EAA), acid modified polyethylenes, copolyamides, and ethyl acrylate. The first, second, third, and final adhesive layers may be formed the same adhesive or different adhesives.

Figure 5:
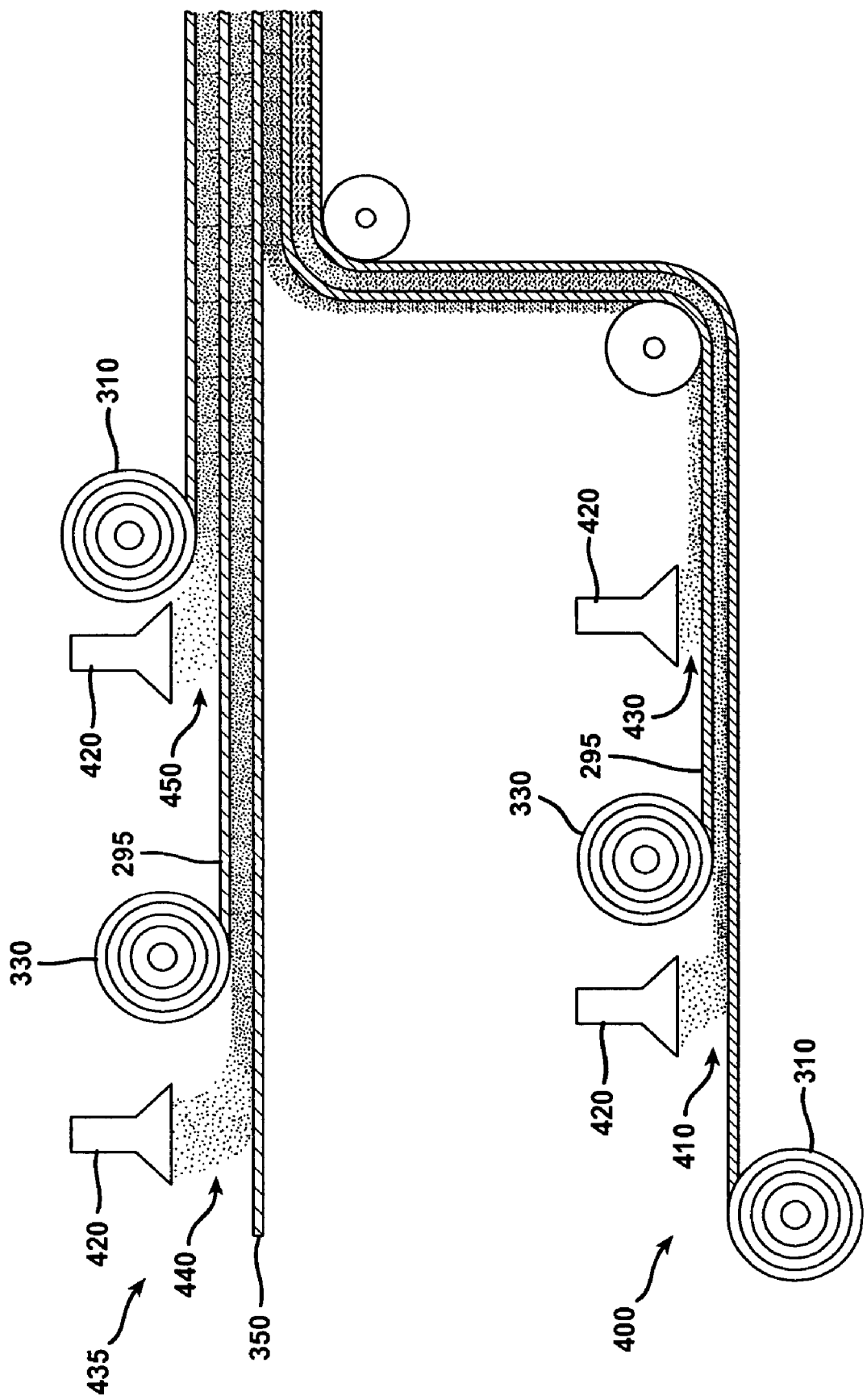
FIG. 5 is a schematic illustration of a wet polyurethane laminate process for making a glass/polyurethane layered composite product according to at least one other exemplary embodiment of the present invention.

In another exemplary embodiment, the chopped strand mat 295 may be used in a wet polyurethane foam laminate process for producing liners for automobiles. An example of such a wet polyurethane foam laminate process is illustrated in FIG. 5. In a first assembly line 400, a first liquid adhesive layer 410 is deposited onto a scrim 310 via an adhesive dispensing apparatus 420. A chopped strand mat 295 fed from a roll 330 is laminated onto the first liquid adhesive layer 410 and covered by a second liquid adhesive layer 430 such that a layer of chopped strand mat 295 is sandwiched between the first and second liquid adhesive layers 410, 430. The first laminate product thus produced may be formed of sequential layers of a scrim 310, a first liquid adhesive layer 410, a layer of a chopped strand mat 295, and a second liquid adhesive layer 430.

In a second assembly line 435, a third liquid adhesive layer 440 is deposited onto a semi-rigid polyurethane foam material (such as polyurethane foam boards 350) via an adhesive dispensing apparatus 420. It is to be appreciated that other structural boards or structural layers may be substituted for the polyurethane foam boards 350 and layered composite products 460 including such structural boards or layers are considered to be within the purview of this invention. A chopped strand mat 295 fed from a roll 330 is laminated onto the third liquid adhesive layer 410 and covered by a fourth liquid adhesive layer 450. A scrim 310 is then positioned on the fourth liquid adhesive layer 450 to form a second laminate product that includes sequential layers of polyurethane boards 350, a third liquid adhesive layer 440, a layer formed of a chopped strand mat 295, a fourth liquid adhesive layer 450, and a scrim 310.

As depicted in FIG. 5, the first and second assembly lines may converge in-line in a manner such that the second adhesive layer 430 is positioned adjacent to the polyurethane boards 350. The layered composite product 460, shown schematically in FIG. 6, may be formed of consecutive layers of a scrim 310, a first liquid adhesive layer 410, a layer formed of a chopped glass mat 295, a second liquid adhesive layer 430, polyurethane boards 350, a third liquid adhesive layer 440, a second layer formed of a chopped glass mat 295, a fourth liquid adhesive layer 450, and a scrim 310. The first, second, third, and fourth liquid adhesives forming the first liquid adhesive layer 410, second liquid adhesive layer 430, third liquid adhesive layer 440, and fourth liquid adhesive layer 450 are preferably a polyurethane-based adhesive, and the adhesives may be the same or different from each other. The layered composite product 460 may be passed through a lamination oven (not shown) where heat and pressure are applied to form a final laminated composite material (not shown). The laminated composite material may be further processed by conventional methods into composite products such as a liner for an automobile. For example, the laminated composite material may be trimmed and formed into a headliner, such as by a molding process. Foam or fabric may then be applied to the headliner for aesthetic purposes. It should be appreciated that although the above-described dry and wet foam laminate processes have been described in what is believed to be the preferred embodiments, other variations and alternatives to these processes identifiable to those of skill in the art are also considered to be within the purview of the invention.

It is an advantage of the present invention that chopped strand mats formed as described above have a more uniform weight consistency compared to conventional chopped strand glass mats. Uniform weight consistency in the inventive chopped strand mats results in uniform properties in the final products. For example, a uniform weight consistency is advantageous when the headliners formed from the mats are to have DVD capabilities or curtain airbags which deploy from the headliner sides. Without uniform weight consistency, the curtain air-bags may not deploy at the targeted deployment rate.

In addition, the uniform properties of the inventive chopped strand mat aids in using lower weight reinforcements than traditional chopped strand glass mats. Additionally, the inventive chopped strand mat provides improved flow and conformability of the overall headliner substrate, which results in more design and styling freedom to the auto manufacturer. Also, chopped strand mats according to the instant invention provide improved molding capability by increasing the draw ratio and are able to conform to the shape of the headliner and still provide uniform properties.

In addition, the chopped strand mat provides the ability to optimize and/or tailor the physical properties (such as stiffness or strength) needed for specific applications by altering the weight, length, and/or diameter of the reinforcement fibers and/or thermoplastic bonding fibers used in the chopped strand mat. Further, the sizing chemistry of the reinforcement fibers may be easily adapted to match the properties of individual types of thermoplastic bonding fibers. As a result, a large variety of chopped strand mats and composite products formed from the chopped mats can be formed. Further, the chopped strand mat has a uniform or substantially uniform distribution of reinforcement fiber bundles and bonding fibers, thereby providing improved strength as well as improved acoustical and thermal properties, strength, stiffness, impact resistance, and acoustical absorbance.

Additionally, the use of wet use chopped strand glass fibers provides a cost advantage over conventional dry-laid glass processes. For example, wet use chopped strand glass fibers are less expensive to manufacture than dry chopped fibers because dry fibers are typically dried and packaged in separate steps before being chopped. In addition, wet use chopped strand glass fibers may be easily opened with little generation of static electricity due to the moisture present in the glass fibers. As a result, the use of wet use chopped strand glass fibers allows the chopped strand mat to be manufactured with lower costs. Also, because the reinforcement (glass) fibers are not filamentized, they have the ability to wet with the other components in the sheet (polyurethane foam). If the reinforcing fibers do not wet the thermoplastic bonding component(s) of the sheet, there may be delamination and poor mechanical performance of the final product.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of forming an acoustical and thermally insulative chopped strand mat suitable for use in automotive applications comprising the steps of:
   at least partially opening bundles of wet reinforcement fibers;
   removing at least a portion of water from said partially opened bundles of wet reinforcement fibers to form dehydrated reinforcement fiber bundles;
   mixing said dehydrated reinforcement fiber bundles and a thermoplastic bonding material to form a substantially homogenous mixture of said dehydrated reinforcement fiber bundles and said thermoplastic bonding material;
   forming said mixture of said dehydrated reinforcement fiber bundles and said thermoplastic bonding material into a sheet; and
   bonding at least some of said dehydrated reinforcement fiber bundles and said thermoplastic bonding material to form a chopped strand mat.

2. The method of claim 1, wherein said bonding step comprises:
   heating said sheet to a temperature above the melting point of said thermoplastic bonding material and below the melting point of said dehydrated reinforcement fiber bundles to at least partially melt said thermoplastic bonding material and bond at least a portion of said dehydrated reinforcement fiber bundles and said thermoplastic bonding material.

3. The method of claim 2, wherein said forming step comprises:
   passing said mixture of said dehydrated reinforcement fiber bundles and said thermoplastic bonding material through a sheet former.

4. The method of claim 3, further comprising the step of:
   transporting said mixture of said dehydrated reinforcement fiber bundles and said thermoplastic bonding material to a filling box tower prior to said forming step, said filling box tower volumetrically feeding said mixture to said sheet former.

5. The method of claim 2, further comprising the step of:
   subjecting said sheet to a needling process to mechanically bond said dehydrated reinforcement fiber bundles and said thermoplastic bonding material prior to said bonding step; and
   wherein said thermoplastic bonding material is at least one material selected from the group consisting of thermoplastic fibers, thermosetting fibers and bicomponent fibers.

6. The method of claim 1, wherein said bonding step comprises:
   subjecting said sheet to a needling process to mechanically bond said dehydrated reinforcement fiber bundles and said thermoplastic bonding material; and
   wherein said thermoplastic bonding material is at least one material selected from the group consisting of thermoplastic fibers, thermosetting fibers and bicomponent fibers.

7. The method of claim 1, further comprising the step of:
   adding a bonding agent prior to said bonding step, said bonding agent being selected from the group consisting of resin powders, resin flakes, latex polymers, resin granules, adhesive foams and organic solvents.

8. The method of claim 1, further comprising the step of:
   opening bundles of said thermoplastic bonding material to filamentize said thermoplastic bonding material, said thermoplastic bonding material being at least one member selected from the group consisting of thermoplastic fibers, thermosetting fibers and bicomponent fibers.

9. The method of claim 1, wherein said wet reinforcement fibers are wet use chopped strand glass fibers and said thermoplastic bonding material is at least one member selected from the group consisting of thermoplastic fibers, thermosetting fibers and bicomponent fibers.

* * * * *